UNITED STATES PATENT OFFICE.

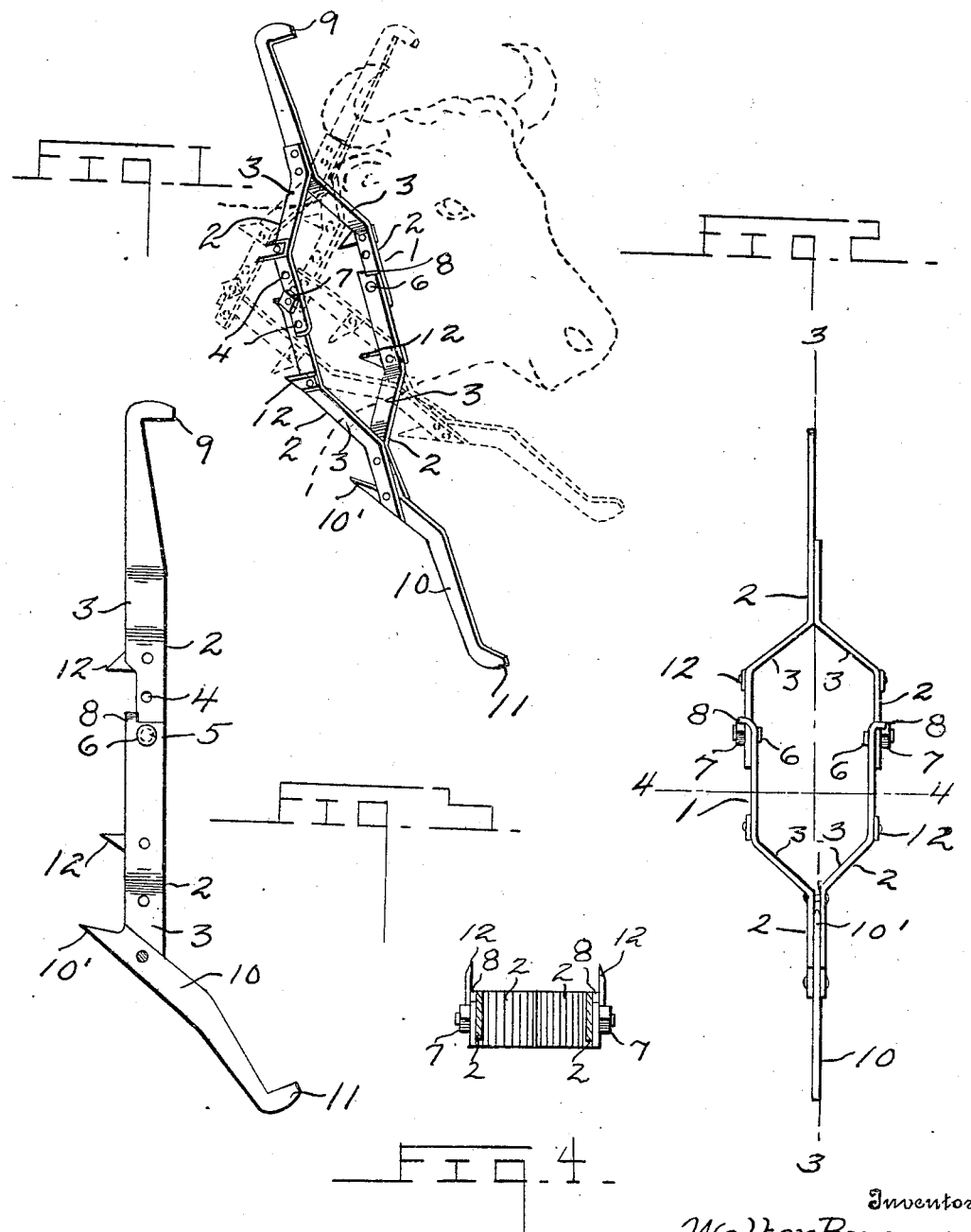

WALTER BREWER, OF MALCOLM, NEBRASKA.

ANIMAL-POKE.

956,755.  Specification of Letters Patent.  Patented May 3, 1910.

Application filed June 26, 1909. Serial No. 504,533.

*To all whom it may concern:*

Be it known that I, WALTER BREWER, a citizen of the United States, residing at Malcolm, in the county of Lancaster and State of Nebraska, have invented certain new and useful Improvements in Animal-Pokes, of which the following is a specification.

This invention relates to new and useful improvements in animal pokes such as are employed upon breachy cattle to prevent them from forcing their way through wire fences or similar barriers, and has for its object to provide an extremely simple and durable device of this character whereby the efficiency of the same will be materially increased.

Another object is to provide two yoke sections, which are adapted to encircle the neck of the animal, to which are secured extending spurs which will enter the animal's flesh should he attempt to escape between the wires of a fence.

A further object is to provide an animal poke, comprising two sections which will allow of the animal assuming a reclining position, the sections being forwardly inclined to prevent injury to the animal.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a perspective view illustrating the position of the device upon the neck of an animal. Fig. 2 is a rear elevation of the same. Fig. 3 is a section taken on the line 3—3 of Fig. 2. Fig. 4 is a section taken on the line 4—4 of Fig. 2.

Referring to the drawings, 1 indicates the yoke sections, which comprise the metal bars 2 which are riveted together at one end and are transversely inclined and vertically extended as at 3 to provide the substantially U-shaped extremities. The lower ends of the upper yoke sections are slightly reduced in width and provided with a plurality of apertures 4, which are adapted to register with a single aperture 5 in the upper ends of the lower yoke section. Bolts 6 are extended through the ends of the yoke sections and are secured therein by means of the clamping nuts 7. It will be noted that the apertures 4 are formed adjacent to the edge of the upper yoke section and, consequently, when the sections are secured together they will be disposed out of vertical alinement with each other. Thus the ends of the upper yoke section which are disposed upon the lower section do not entirely cover the same, and stops 8 are transversely disposed upon the upper ends of the lower section and limit the movement of one section upon the other in either direction.

One of the bars 2 of the upper yoke section is extended beyond the end of the other of the bars and is formed with a lateral extension 9 upon the extremity thereof. An inclined bar 10 is secured between the lower ends of the lower yoke section and extends rearwardly at its upper end, terminating in a spur 10'. The forward portion of the bar 10 is inclined forwardly at an obtuse angle to the rear portion thereof and has its extremity laterally extended as at 11. Spurs 12 are secured to each of the side bars of the yoke members and project rearwardly thereof. The spurs 12 are, however, considerably shorter than that formed upon the end of the bar 10. The yoke sections are first adjusted upon each other, after the same have been placed around the neck of the animal and the clamping nuts 7 adjusted upon the ends of the bolts 6 so as to allow pivotal movement of the sections with relation to each other. Should the animal attempt to force his way through the line wires of a fence, the lateral extensions formed upon the extremities of the bars 2 will engage with the wires and draw the device back upon the neck of the animal, so that he will be prodded by the spurs secured thereto and will desist in his efforts to escape. It will be noted that the stops 8 will absolutely prevent any pivotal movement of the sections due to the contact of the same with the wires, so that it will be impossible for the device to fold and be extended through the same. To allow of the free movement of the animal's head when grazing and to prevent the spurs entering the flesh when the animal assumes a reclining position, I have constructed a device which will fold forwardly upon the animal's neck and no inconvenience will be caused thereby. The forward pivotal movement of the sections is likewise limited by means of the stops 8 as clearly shown in dotted lines in Fig. 1. To insure the pivotal movement of the sections the bar 10 is angularly disposed as above described. It will be seen that as the animal's head approaches the ground, the lower end of the bar 10 will contact therewith and gradually move forwardly, until the sections are disposed at an inclination to each other, and the spurs are drawn away from any possibility of contact with the animal's neck. By this means all danger of injury to the animal is obviated and his natural movements and inclinations are in no wise interfered with.

From the foregoing it will be seen that I have provided a simply constructed and highly efficient animal poke, which may be readily secured upon the necks of animals of various sizes and which will effectively prevent their escape from an inclosure. The yoke sections may be readily stamped out of bar metal and when assembled into operative position will provide a durable and effective device.

What is claimed is:

An animal poke comprising two pivoted yoke sections, a stop formed upon one of said sections preventing the rearward movement and limiting the forward movement of said sections, a lateral extension formed upon the extremity of the upper section, an angular bar secured to said lower section and having its lower extremity laterally extended, and a plurality of spurs secured to said sections and extending rearwardly thereof.

In testimony whereof I affix my signature, in presence of two witnesses.

WALTER BREWER.

Witnesses:
J. V. WILLMAN,
W. E. BEHRING.